United States Patent [19]

Ciarlei et al.

[11] Patent Number: 4,909,600
[45] Date of Patent: Mar. 20, 1990

[54] LIGHT CHOPPER ASSEMBLY

[75] Inventors: Joseph A. Ciarlei, Marcellus; Gary L. Rink, Jordan; Dominick A. Danna, Syracuse, all of N.Y.

[73] Assignee: Welch Allyn, Inc., Skaneateles Falls, N.Y.

[21] Appl. No.: 264,258

[22] Filed: Oct. 28, 1988

[51] Int. Cl.[4] ............................................. G02B 5/22
[52] U.S. Cl. ..................................... 350/317; 350/274; 350/315; 358/42; 356/233; 250/233
[58] Field of Search ............... 350/314, 317, 318, 316, 350/315, 311, 273, 274; 358/42, 98, 103; 356/320, 233; 250/233

[56] References Cited

U.S. PATENT DOCUMENTS

| | | | |
|---|---|---|---|
| 2,844,987 | 7/1958 | Parker | 350/315 |
| 3,299,274 | 1/1967 | Hoelter | 250/233 |
| 3,493,748 | 2/1970 | Tajima | 350/315 |
| 3,603,722 | 9/1971 | Graham | 358/42 |
| 3,856,418 | 12/1974 | Levine | 356/233 |
| 4,165,919 | 8/1979 | Little | 350/273 |

Primary Examiner—Bruce Y. Arnold
Assistant Examiner—Loha Ben
Attorney, Agent, or Firm—Wall and Roehrig

[57] ABSTRACT

A light chopper wheel for use in a video system that is capable of producing either black and white or full color images. The wheel is formed of two circular sheet metal plates that are joined in back-to-back contact. A first series of circumferentially spaced color filter windows are located about a first diameter on the wheel and a second series of clear windows are circumferentially spaced about a second diameter on the wheel so that a clear window is radially adjacent each color filter window. Recesses are stamped in the back of each plate behind each color filter window and filters are mounted between the plates within the recesses.

10 Claims, 1 Drawing Sheet

LIGHT CHOPPER ASSEMBLY

BACKGROUND OF THE INVENTION

This invention relates to a light chopper assembly and in particular to a light chopper suitable for use in a video endoscope or borescope capable of producing either a black and white picture or a full color picture of a target.

Many endoscopes and borescopes are now video equipped to provide television pictures of a remote target. A light source is used to illuminate a target region within the viewing plane of the system's optics. White light from a source is transmitted through a probe into the target region and reflected light from the target is focussed by the optics upon an imager where the image information is converted to television compatible electrical signals. A more detailed description of this type of system is provided in U.S. Pat. Nos. 4,532,918 and 4,539,586.

In many of these endoscopeo or borescope systems a filter wheel is used to generate sequential color separated images of the target. The wheel is arranged to rotate through the beam emitted by the light source to project, in sequence, light of separate colors incident or the target. Reflected light from the target is received by the imager as color separated images. The field sequential color video signals are then brought together in a video processor to produce a full color picture of the target.

The color wheel is typically configured with separate filters spaced apart in a circular pattern. The regions between the filters do not transmit light, and hence these regions act as light shutters as used in a conventional camera. During the period that light from the source is being blocked, the image processor, having received a color separated image, is being read out by conventional video processing circuitry to produce a video picture. This type of system is further disclosed in U. S. Pat. Nos. 4,546,379 and 4,523,224.

To convert a color system of this type to a black and white system, unfiltered white light from a source may be transmitted directly to the target region. However, the need for the shutter function still remains. This function can be satisfied by simply removing the filters from the wheel to provide clear windows through which light can pass as the wheel rotates through the light beam. The regions between the windows chop the light and permit the images to be processed sequentially.

In many endoscopic or borescope applications, optimum color pictures can only be acquired when the target is within twelve inches of the imager. Targets located further away from the imager are, better viewed as black and white pictures. In practical applications, however, the target range may be anywhere from zero to three feet. Therefore, for optimum image viewing, both color and black and white systems are required. Apparatus for converting a video endoscope or borescope from a color system to a black and white system is described in co-pending U.S. patent application Ser. No. 221,776, filed July 20, 1988, now U.S. Pat. No. 4,862,253 in the name of English, et al. In the English device, a series of filter windows are circumferentially mounted about a wheel and a similar series of clear windows are positioned radially adjacent to the filter windows. A mechanism is provided which permits a light source's position relative to the wheel to be selectively changed. When in one position the source beam is sequentially passed through filter windows containing red, green and blue filters as the wheel rotates to produce a full color picture of a target. When in a second position the source beam passes through the clear windows to produce a black and white picture of the target.

The system for selectively converting a video equipped endoscope or borescope to produce either color or black and white pictures functions quite well in practice. It has, however, been found difficult to fabricate light chopping wheels suitable for use in this type of conversion system. The conversion wheels tend to be relatively heavy. A good deal of inertia is built up when a heavy wheel is turning at high speed which can cause the system to go out of synchronization. Resynchronization of this system may take up to fifteen seconds to accomplish, which in certain endoscopic applications, cannot be tolerated. The use of lightweight plastic wheels has not been totally satisfactory because the high operating temperatures of the lamps adversely effects many lightweight plastic materials. In addition, mounting color filters in a wheel has heretofore required a number of machining steps that were both time consuming and expensive.

OBJECT AND SUMMARY OF THE INVENTION

It is therefore an object of the present invention to improve light chopping wheels used in video endoscopes and borescopes.

A further object of the present invention is to provide a lightweight light chopper assembly that is suitable for use in a video endoscope or borescope that can be selectively converted from a color system to a black and white system.

A still further object of the present invention is to provide lightweight light chopper assembly that can withstand high lamp temperatures.

Another object of the present invention is to provide a lightweight assembly that can be simply stamped from thin metal sheets and easily assembled with a minimum amount of manufacturing steps.

Yet another object of the present invention is to provide a light chopper assembly that is suitable for use in a video endoscope or borescope which can be brought rapidly up to synchronous speed when the system is either turned on or switched from one operational mode to another These and further objects of the present invention are attained by means of a light chopper assembly that contains a wheel that is formed by joining the sheet metal plates in back-to-back contact. The wheel has a first series of windows spaced about one diameter on the wheel and a second series of windows spaced about a second diameter on the wheel. Color filters are mounted between the plates behind each window in the first series. A central hub is also provided by which the wheel is attached to a drive means such as a synchronous motor. In operation, the wheel is used in the imaging system of a video equipped endoscope or borescope to rotate through a beam of light used to illuminate the target region of the scope. The position of the wheel relative to the light beam may be altered whereby the beam is directed at either the first or the second diameter on the wheel. In one mode, the wheel passes the clear windows sequentially through the beam to create a black and white picture of the target. In a second mode, the wheel passes the filter windows sequentially through the beam to create a color picture of the image.

BRIEF DESCRIPTION OF THE DRAWING

For a better understanding of these and other objects of the present invention, reference will be made to the following detailed description of the invention which is to be read in conjunction with the accompanying drawings, wherein.

DETAILED DESCRIPTION OF THE INVENTION

Turning now to the drawings, there is shown a light chopper assembly generally referenced 10 that is suitable for use in a video equipped endoscope or borescope that can selectively provide a black and white picture or a full color picture of a target. The light chopper assembly is circular in form and includes two flat sheet metal plates 12 and 13 (FIG. 2), that are joined together in back-to-back relationship. As will be explained in greater detail below, the two plates making up the wheel are stamped from thin sheets of metal. Each plate has the same contour as the other so that they can be fabricated from a single stamping die. This considerably reduces the number of steps required to fabricate the wheel and considerably reduces manufacturing costs.

Figure 2:
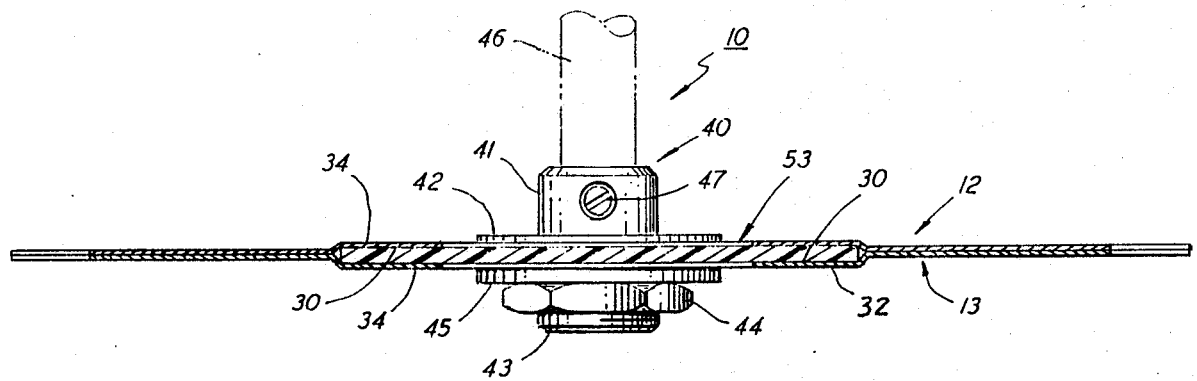
FIG. 2 is an enlarged sectional view taken along lines 2—2 in FIG. 1.

Each plate contains three similar cutouts 15, 16 and 17 that are spaced 120 degrees apart. Each cutout includes a pair of radial side walls 18 and 19 that pass inwardly from the outer periphery 20 of the plate and a bottom wall 21 that extends between the side walls. A circular rib 25 is located above the bottom wall of the cutout. The rib divides the cutout into two separate apertures; a lower aperture 26 and an upper aperture 27. As best seen in FIG. 2, a recess 30 is stamped in back of each plate about the perimeter of the lower aperture. The recess creates a slight bulge in the front surface of the plate which does not adversely effect the aerodynamics of the wheel or its balance.

In assembly, the two plates are placed in back-to-back contact with the apertures in co-aligned registration. Each rib includes a deformable tab 35 that depends outwardly from the outer periphery of the rib. The tabs on one plate are bent over and crimped into locking contact against the adjacent rib of the opposing plate.

A central mounting hub 40 is secured to the wheel which also serves to hold the plates together in assembly. The hub has a body section 41, expanded collar 42 and a threaded shank 43 that extends outwardly from the collar. In assembly, the threaded shank is inserted through a hole that passes through the center of the wheel. A nut 44 is threaded onto the shank and is tightened down to lock the plates securely between washer 45 and collar 42. The shaft 46 of a synchronous motor used to turn the wheel is inserted into the hub and the hub is locked to the shaft by means of a set screw 47.

Color filters are mounted between the plates in the spaces formed by adjacent recesses 30—30. The filters include a red filter 51, a green filter 52 and blue filter 53. Each filter complements the shape of the space provided between the plates and has a thickness that is about equal to or slightly greater than the depth of the space so that the filter is securely held in assembly when the plates are locked together.

Figure 1:
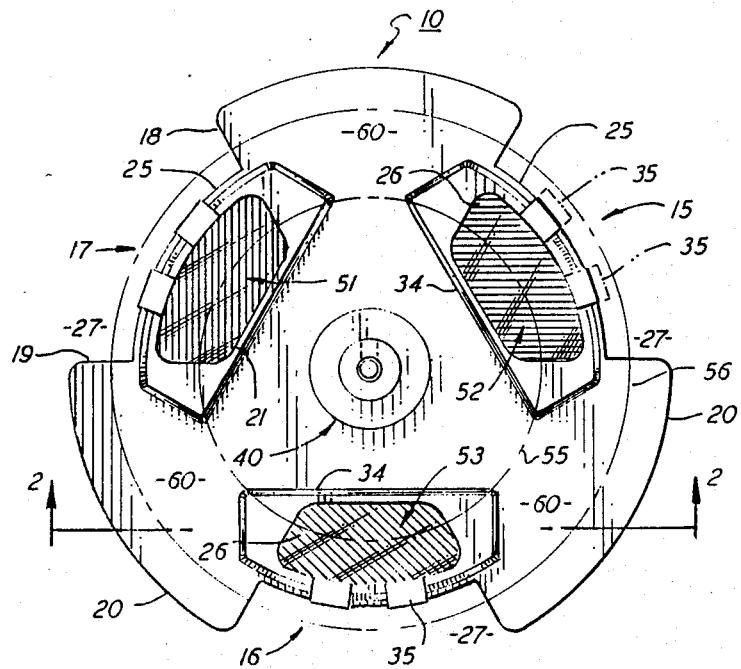
FIG. 1 is a top plan view of a light chopper assembly embodying the teachings of the present invention.

As best seen in FIG. 1, the assembled light chopper wheel contains three filter windows that are circumferentially spaced about a first diameter 55 of the wheel and three clear windows that are similarly spaced about a second diameter 56 of the wheel. The windows in each series of windows are separated by opaque wheel regions 60—60. Accordingly, as the wheel is rotated through a light beam directed at either diameter, the light beam is sequentially broken or chopped in desired illumination segments that are compatible with the video system. The wheel can thus be employed in endoscope or borescope systems capable of producing either a black and white or a color picture. Because of its lightweight construction, the wheel can be quickly brought to synchronous speed when the video system is turned on or when the mode of operation is changed from black and white to color or visa versa.

As should be evident from the disclosure above, the present wheel is both lightweight and rugged. It is also impervious to the high temperatures generated b most lamps used in this type of environment. The wheel can be manufactured from inexpensive stamped parts and easily assembled using a minimum amount of labor.

While this invention has been explained with reference to the structure disclosed herein, it is not confined to the details as set forth and this application is intended to cover any modifications and changes as may come within the scope of the following claims.

What is claimed is:

1. A light chopper assembly that includes
   a wheel that is arranged to pass through a fixed light beam and which is formed by joining a pair of similarly shaped thin metal plates in back-to-back contact,
   said wheel having a series of filter windows circumferentially spaced about a first diameter on the wheel and a second series of clear windows circumferentially spaced about a second diameter on the wheel,
   a color filter means mounted between the plates behind each filter window,
   each color filter means being transparent to said light beam to permit light to pass therethrough, and
   each filter window being positioned adjacent to a clear window so that two opposed side walls of the adjacent windows lie along a common radius of said wheel whereby each window is capable of passing through the light beam in the same period of time.

2. The assembly of claim 1 that further includes hub means for connecting the wheel to a drive means.

3. The assembly of claim 1 wherein said filter windows are spaced at equal intervals about said first diameter and the clear windows are spaced adjacent to the filter windows, at the same intervals about said second diameter.

4. The assembly of claim 3 wherein the wheel contains three filter windows spaced at 120 degree intervals and further includes a red filter, a green filter and a blue filter.

5. The assembly of claim 1 wherein each plate contains a deformable tab means that are bent over and clamped against the other plate in assembly.

6. The assembly of claim 1 that further includes a recess that is stamped into the back of each plate about the perimeter of each filter window in which a filter is mounted.

7. A light chopper assembly for use in a video system for creating either black and white images, or full color images of a target, said light chopper assembly including a pair of complementary circular sheet metal plates each having a flat back surface and a flat front surface, each plate having a plurality of cutouts formed therein, each cutout further including a pair of opposed radially disposed side walls that pass inwardly from outer peripheral wall of the plate toward the center of the plate, a bottom wall extending between the two radially disposed side walls and a rib that extends between the side walls to divide the cutout into an upper aperture and a lower aperture, each plate being deformed outwardly from its back surface toward its front surface to form a recess about the perimeter of each lower aperture, means to join said plates in back-to-back contact so that the apertures are in co-aligned registration with each other whereby the recessed lower apertures form a series of filter windows that are circumferentially spaced about a first diameter and the upper apertures form a series of clear windows that are circumferentially spaced about a second diameter, and a color filter mounted between the plates within each recessed filter window.

8. The light chopper assembly of claim 7 wherein each rib includes a deformable tab depending outwardly from the outer rim thereof, said tab being bent over an adjacent rib in assembly to secure the plates in back-to-back contact.

9. The light chopper assembly of claim 8 that further includes a centrally mounted hub means for coupling the assembly to a drive means.

10. The light chopper assembly of claim 9 having three filter windows and further includes a red, a green and a blue filter mounted in respective windows so that the filter moves in sequence past a fixed point as the assembly is rotated about the hub means.

* * * * *